June 8, 1926.  
E. E. PEARCE  
METHOD OF AND MEANS FOR THAWING  
Filed Feb. 1, 1923    3 Sheets-Sheet 1

1,587,984

Witnesses:  
W. F. Kilroy  
Harry R. L. White

Inventor  
Edward E. Pearce

June 8, 1926.

E. E. PEARCE 1,587,984

METHOD OF AND MEANS FOR THAWING

Filed Feb. 1, 1923     3 Sheets-Sheet 2

Witnesses
W. F. Kilroy
Harry R. L. White

Inventor
Edward E. Pearce
By Brown, Bortner & Diemer
Attys.

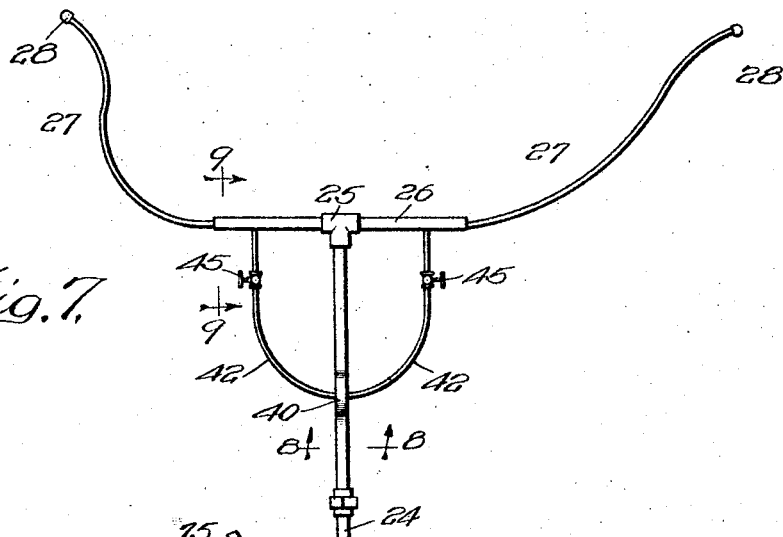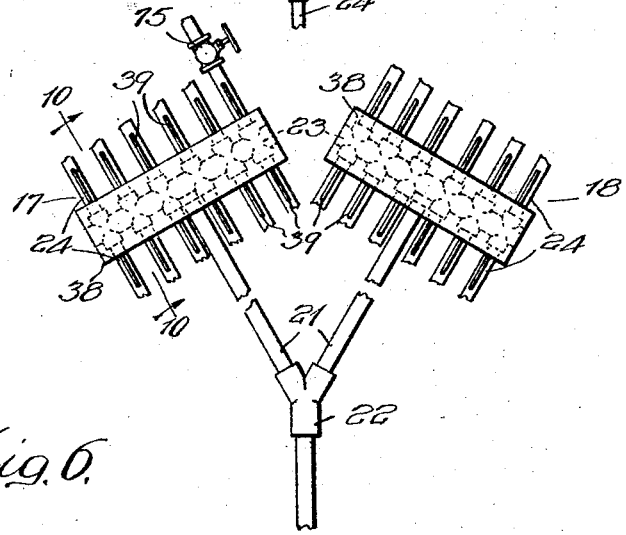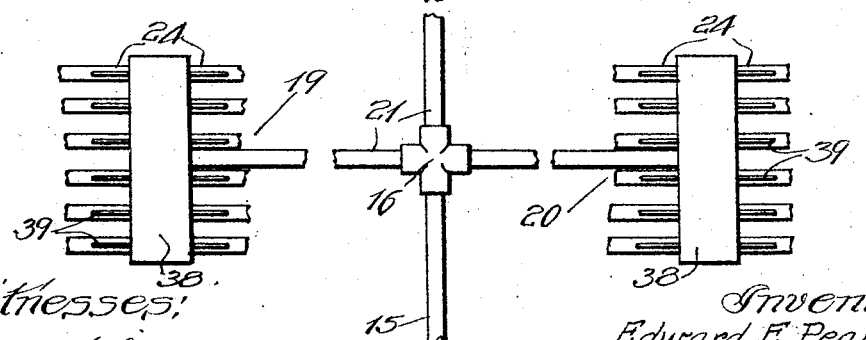

Patented June 8, 1926.

1,587,984

UNITED STATES PATENT OFFICE.

EDWARD E. PEARCE, OF GALESBURG, ILLINOIS.

METHOD OF AND MEANS FOR THAWING.

Application filed February 1, 1923. Serial No. 616,240.

My invention relates to an improved method of and means for thawing and more particularly an improved method of and means for thawing mineral bearing ground to facilitate the exploitation thereof.

It is an object of my invention to provide a method of and means for thawing, the functioning and results of which will be an improvement over the functioning and results of the methods and means heretofore provided.

A more specific object is to increase, where water, especially cold water, is employed as the thawing medium, the penetration of the water through the ground and to eliminate the pinnacles of frozen ground or so-called frozen "collars" or "horses" which have heretofore remained after the thawing operation.

A further object of my invention is the provision of a method of and means for thawing which shall be simple, inexpensive, and expedient and which shall make possible the profitable exploitation of mineral bearing prospects which have heretofore either not been available at all, or have had to have been abandoned because they could not be worked with sufficient profit to make them worth while.

While my present invention is not limited to use in connection with such systems it is adapted to be practiced with the cold water point systems of thawing heretofore attempted and provides for securing a more complete and uniform thaw than heretofore possible with such systems. In addition to providing for securing a more complete and uniform thaw with such systems my present invention provides for making the distances permissible between the various points greater than heretofore possible, thereby increasing the area thawed with a given amount of labor and a given number of points of a given size and with a given amount of water at a given pressure or head.

As already stated my present invention is not limited to use with the cold water point systems of thawing heretofore attempted. I find that highly satisfactory results may be had by injecting air to agitate or decrease the inertia of water seeping through the ground either naturally or by inducing the same or by injecting air to agitate or decrease the inertia of water delivered to the ground in any other manner than by the point systems referred to. In fact the injection of air to agitate or decrease the inertia of other thawing fluids or mediums than water is contemplated within the scope of my present invention.

A still further object of my invention is to decrease the time heretofore required in thawing a prospect or mineral bearing area.

I shall now describe my invention in connection with the accompanying drawings forming a part of the present specification which drawings illustrate more or less diagrammatically certain manners of carrying out the invention, and certain details which I have found practical. It is my belief however, that my present invention is a pioneer one in the art of thawing frozen ground and while they may be highly desirable, I do not therefore intend to be limited to such details as I may hereinafter elect to describe.

In the drawings:

Figure 6 is a more or less diagrammatic top plan view of an apparatus which I have found highly satisfactory in practicing a particular embodiment of my invention;

Figure 7 is a plan view showing the bridle arrangement thru which each of the pipes leading from the various units is connected to the points at the outer ends thereof;

Figure 1:
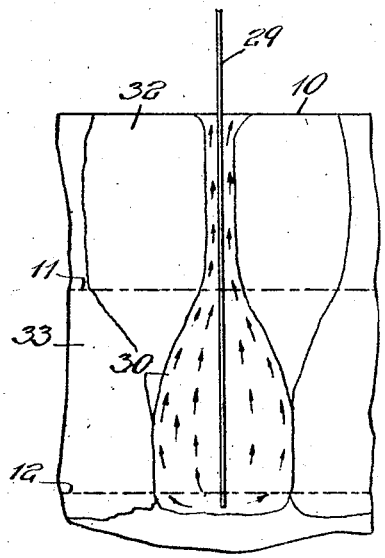
Figure 1 is a vertical sectional view through an area of ground being thawed with an ordinary cold water point showing the substantial configuration of the resulting thaw.
Figure 2:
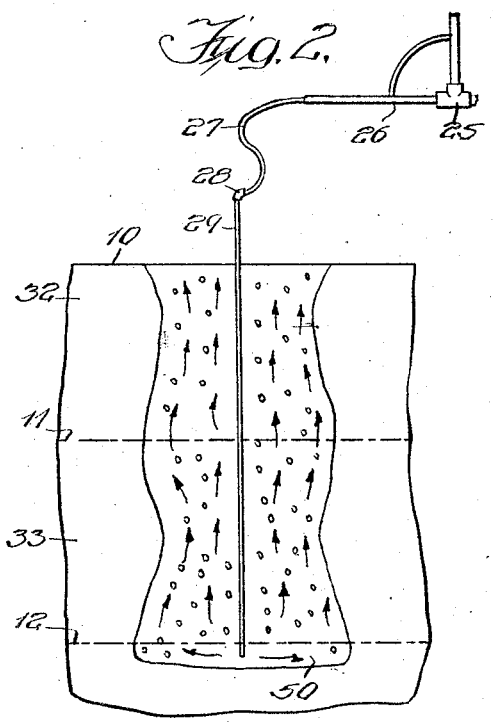
Figure 2 is a similar view showing an area thawed in accordance with the teachings of my invention and the substantial configuration of the resulting thaw.

In Figs. 1 and 2 of the drawings, 10 designates the surface of the ground. The dot and dash line 11 locates the lower limit of the muck and the dot and dash line 12, the approximate level of the bedrock at which the greater percentage of gold deposits are usual found.

With reference now to Figs. 2, 6, 7, 8, 9 and 10 the particular apparatus which I have elected to explain the manner of practicing the invention with the so-called point systems of thawing, comprises a pipe or conduit 15 which pipe or conduit 15 leads from a source of water supply which source may be elevated as to a ditch on the side of a hill to create a suitable head or a pump or any other suitable means may be employed for creating the desired flow. The pipe 15 conveys the water to a coupling 16 from which four units 17, 18, 19 and 20 are supplied by way of hose connections 21 and a Y coupling 22.

Each of the units 17, 18, 19 and 20 comprises a main 23 from each of which mains a plurality of pipes or conduits 24 lead or extend to and are connected thru suitable T's 25 with bridles 26. A hose connection 27 extends from the opposite end of each of said bridles 26 the free ends of these hose connections 27 being connected as through suitable elbows 28 with the so-called points or pipes 29.

In thawing the pipes 29 are inserted into the ground at suitable distances or intervals. The various points may be inserted by holding them upright with the lower end from which the water is discharging or flowing on the surface of the ground, the discharging water thawing the muck or gravel immediately ahead of the point and the pipe being gradually depressed until the desired depth is atained, usually just below the upper level of the bedrock or in other words, the pipes 29 are inserted to approximately the lowest point below the area to be thawed. Of course, the points may be sunk or inserted in any other suitable or desired manner. The point will usually go down of its own accord through ice or muck.

A hole is thus thawed very little larger than the point itself and the water discharged from the lower inserted end of the pipe gradually returns or follows up the sides of the pipe to the surface 10. In this manner an annular thaw is gradually formed about each inserted point. The points with the water continuously flowing therefrom are left in the ground from one to seven days, the water following up the sides of the points to the surface of the ground gradually increasing the width of the thawed areas. When the thawed area reaches the margin of the area 30, (Fig. 1) it meets the thawed area about the next point and theoretically all ground between the two points should be thawed. I have found by actual practice however, that the areas heretofore thawed about the various points instead of being substantially cylindrical are fairly large at the bottom of each point and then towards the surface of the ground they gradually lessen in their penetration, enlarging slightly at the surface of the ground, so that the areas thawed by each point take more or less the shape of a ten-pin as shown at 30 in Fig. 1. The result is that the thaw of the muck stratum 32 above the gravel stratum 33 and even in some instances the thaw of the gravel stratum itself does not meet the thaw of the adjacent point.

Consequently as in thawing with steam points, numerous pinnacles of frozen ground or so-called frozen "collars" or "horses" have remained after the thawing operation. These pinnacles or frozen masses hinder and interfere with proper dredging, they damage the dredging apparatus and they have increased the cost of working frequently to such extent that prospects have had to be abandoned because they could not be worked with a profit. This has been especially so where layers or deposits of muck are found over the ground.

Of course, theoretically it would be possible to completely thaw the ground with the above process by arranging the points so close together that the area of least penetration about each point would meet the area of least penetration about the adjacent points. The cost in such a case would be prohibitive of the exploitation of the average gold bearing areas, the working of a given area would be materially slowed up, the labor necessary would be increased and the greater overlap of the thaw about the lower ends of the points to secure a meeting of the areas of least penetration would be unwarranted.

According to the theory of my invention, I inject air to increase the penetration of the water. I have found by actual practice that by injecting air the water may be violently agitated by the pressure of the air and by its tendency to rise to the surface and "mountainous seas" created which materially increase the penetration of the water through the ground. The injection of air provides a simple, inexpensive and highly effective method of decreasing the inertia of the water. The water may of course be made as turbulent as desired. Where water alone is employed under a reasonable head or pressure its action is very sluggish. To increase the water pressure itself requires a great deal more water, which is usually not available and if so only at a prohibitive cost. I have found that where water alone is employed it is necessary to double the head and use twice the amount of water to increase the efficiency of the thaw 12%.

Figure 10:
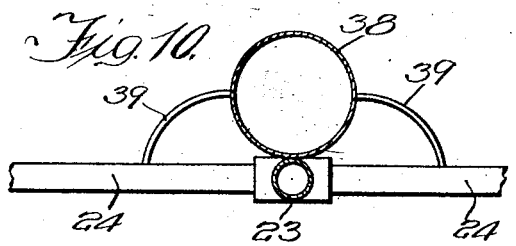
Figure 10 is an enlarged sectional view taken on the line 10—10 of Fig. 6.

In the embodiment shown the opposite ends of the mains 23 are closed. The air is supplied from reservoirs 38 one of which reservoirs is suitably mounted upon each of the mains 23. This arrangement provides a source of air at least somewhat near the points of each of the various units. To avoid great additional lengths of piping the air is injected directly into the water pipes 24 from the respective reservoirs 38 by means of relatively short tubes 39 connected at their opposite ends to the reservoirs 38 and the adjacent ends of the pipes 24 as shown in Figs. 6 and 10.

Figure 8:
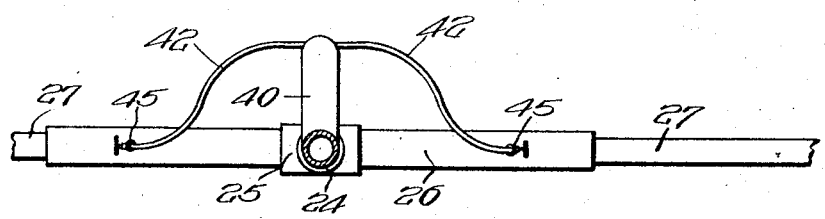
Figure 8 is an enlarged sectional view taken on the line 8—8 of Fig. 7.
Figure 9:
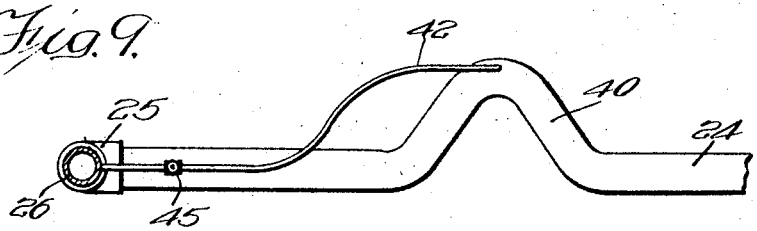
Figure 9 is an enlarged sectional view taken on the line 9—9 of Fig. 7.

From its point of entrance into the pipes 24 the air travels through said pipes with the water to a point just short of the T 25 at the opposite end of the pipe 24. At said point the pipe 24 is provided with a suitable bend 40 or "gooseneck" from which the air is extracted and conveyed by suitable tubes 42 to the opposite ends of the bridle 26 as shown in Figs. 7, 8 and 9. In the flow of the air and water thru the conduits 24 the air travels thru the upper portions of said conduits and thru the upper portions of the bends or "goosenecks" 40. The tubes are therefore preferably connected at the top of the bend 40, as shown so that the major portion of air will be extracted or withdrawn at this point. The slugs of air are thus withdrawn and at the same time the air is thereby automatically distributed in substantially equal portions to the points 29 at the opposite ends of the bridle. The desired distribution of air to these points would not be attained if it were permitted to flow with the water by way of the coupling 25 and the opposite sides of the bridle. Valves 45 are provided for regulating or adjusting the distribution of air by way of the tubes 42. The "gooseneck" just described provides for securing the desired distribution of air to the respective points. This distribution may however be secured in other ways within the scope of my invention. The flow thru the conduits 24 may be regulated or adjusted by valves 75 provided therein.

The air upon being injected from the tubes 42 into the opposite ends of the bridle 26 flows through the hose connections 27 and from the lower ends of the points 29 with the water being delivered thereby. This injection of air decreases the inertia of the water and increases the penetration thereof through the ground. The dimensions of the other apparatus and the quantity and pressure of the water remaining substantially the same, the configuration of the resulting thaw is substantially as shown at 50 in Fig. 2. Not only is the width of the bottom of the thaw increased but the gradual lessening of the area of the thaw toward the surface of the ground is eliminated and a substantially cylindrical thaw is obtained, that is the width or area of the thaw is substantially uniform from the bottom to the surface of the ground.

Consequently the pinnacles of frozen ground are eliminated and by reason of the greater penetration of the water the points may be spaced further apart than possible heretofore. This increases the area thawed with a given amount of labor and a given number of points of a given size and with a given amount of water at a given pressure. The time necessary to thaw a prospect is also decreased.

The air and water need not be injected simultaneously into the points. They may be used together or the air may be injected subsequently to the water. In fact, the injection of air is as already stated not limited to use with the point systems of thawing.

Figure 3:
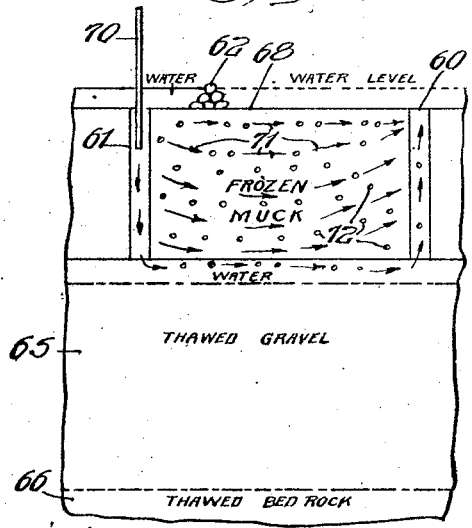
Figures 3, 4 and 5 are diagrammatic vertical sections through areas of ground showing other manners of practicing the teachings of my present invention.
Figure 4:
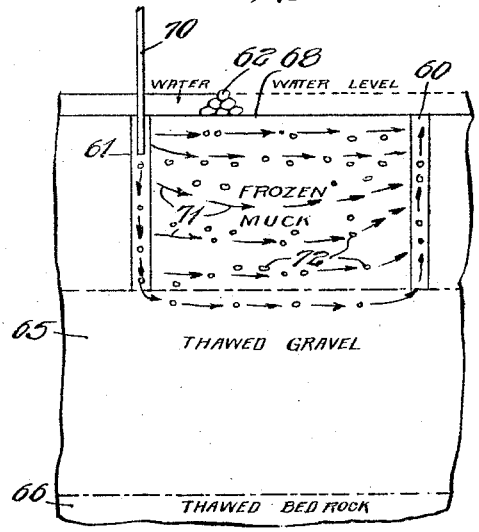
Figure 5:
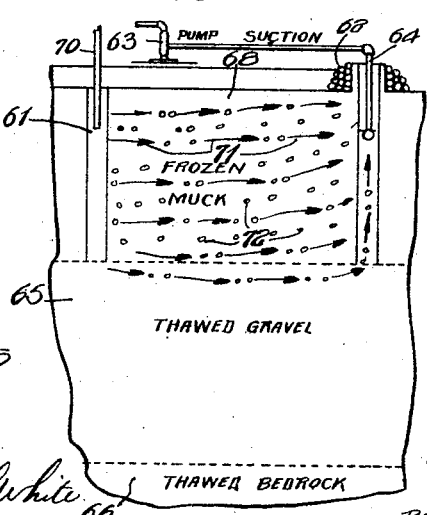

In Figs. 3, 4 and 5 for example, I have shown my present invention embodied in connection with the method disclosed in my copending application Serial No. 456,002, filed March 26, 1921. In these cases a flow of water is created or the seepage increased by sinking a shaft 60 into the ground, the body of water from which the flow is established being shown as a shaft 61 filled with water by conveying the same directly into the top thereof as shown. Circulation of the water to the shaft 60 may be aided by providing a suitable dam 62. Of course, the circulation may be promoted by a pump 63 having a suction pipe 64 arranged with its intake at the bottom of the shaft 60 to induce the circulation of water to said point, at the top of the shaft 60 to induce the circulation up through the muck stratum as shown or otherwise positioned in the shaft.

In each case the gravel stratum 65 and the mineral bearing portion of the bedrock stratum 66 have been thawed. In Fig. 3 a water or seepage stratum has formed along the undersurface of the muck stratum 68. In either case I find that by injecting air as by means of a suitable pipe 70 the uniformity and thoroughness of the water penetration is increased and the uniformity and thoroughness of the resulting thaw improved by the circulation of the air through the ground with the water as shown, the arrows 71 indicating a flow of water through the ground and the dots 72 the flow or circulation of air. The time required to thaw a given prospect is decreased and the muck strata which heretofore have been especially difficult to thaw are thawed thoroughly and uniformly.

It is of course to be understood that there are numerous other ways of carrying out the method or process of my present invention. The foregoing descriptions are simply descriptions of various embodiments of the invention as I have actually practiced them. As already pointed out the invention is not to be taken as limited to the particular details and arrangements which I have elected to describe.

I claim:

1. The method of thawing ground which consists in utilizing the circulation of water through the ground to thaw same and introducing air into the ground at a point below the surface thereof to agitate and decrease the inertia of the water and increase the penetration of same through the ground in a horizontal direction.

2. The method of thawing ground which consists in utilizing the circulation of relatively cold water through the ground to thaw same and introducing relatively cold air into the ground at a point below the surface thereof to agitate and decrease the inertia of the water and increase the penetration of same through the ground in a horizontal direction.

3. The method of thawing which comprises delivering water to the area to be thawed and injecting air to increase the penetration of the water horizontally through the frozen area.

4. The method of thawing ground which comprises introducing relatively cold water and air into the ground together at a point below the surface thereof.

5. The method of thawing ground which comprises sinking a shaft thereinto to create a flow or seepage and to form a thawed stratum through the ground and injecting air to increase the circulation of the flow or seepage horizontally through said thawed stratum and the penetration of the margin of the same thru the ground.

6. A thawing apparatus comprising a water main, a pair of points, a conduit leading from said main to said points, a source of air, means for introducing air from said source into the end of said conduit adjacent said main, and means for extracting the air from the opposite end of said conduit and distributing the same to said points, said means including a pair of tubes leading from said conduit at said bend.

7. A thawing apparatus comprising, a water main, a source of supply therefore, a plurality of points, conduits leading from said main to said points, an air reservoir mounted upon said main, tubes leading from said reservoir to the adjacent ends of said conduits, and tubes being connected between the opposite ends of said conduits and said points for extracting air from said conduit and distributing the same to said points.

8. In apparatus of the class described, a plurality of points for introduction into the ground, water supply means for said points, said points permitting the discharge of water therefrom, and an air supply line for supplying air to said points for discharge with said water.

9. In apparatus of the class described, a plurality of thawing points, a common supply line for supplying a thawing fluid to said points, air supply means delivering into said common supply line and means for evenly distributing the air from said common line to said points.

10. In apparatus of the class described, a plurality of thawing points, a common supply line for supplying a thawing fluid to said points, air supply means delivering into said common supply line and means for evenly distributing the air from said common line to said points, said means comprising means for withdrawing the air ahead of the division to the points and returning it beyond said point of division.

11. In combination, a common supply conduit for a thawing medium, a plurality of thawing points, a coupling between said points and said conduit, means for supplying a motive fluid to said conduit, and means for withdrawing said fluid therefrom and delivering it to the points beyond said coupling.

12. In apparatus of the class described, a source of water, a plurality of points, a conduit leading from said source to said points, means for introducing air into said conduit and means for extracting the air from said conduit and distributing same to said points.

In witness whereof, I hereunto subscribe my name this 18th day of January, 1923.

EDWARD E. PEARCE.